(12) United States Patent
Parsons et al.

(10) Patent No.: US 9,779,245 B2
(45) Date of Patent: Oct. 3, 2017

(54) SYSTEM, METHOD, AND DEVICE HAVING AN ENCRYPTED OPERATING SYSTEM

(71) Applicants: Bernard Parsons, London (GB); Nigel Lee, London (GB); David Holoway, London (GB)

(72) Inventors: Bernard Parsons, London (GB); Nigel Lee, London (GB); David Holoway, London (GB)

(73) Assignee: BeCrypt Limited, London (GB)

( * ) Notice: Subject to any disclaimer, the term of this patent is extended or adjusted under 35 U.S.C. 154(b) by 161 days.

(21) Appl. No.: 13/847,745

(22) Filed: Mar. 20, 2013

(65) Prior Publication Data

US 2014/0289537 A1    Sep. 25, 2014

(51) Int. Cl.
| | |
|---|---|
| *G06F 21/57* | (2013.01) |
| *G06F 21/79* | (2013.01) |
| *G06F 21/31* | (2013.01) |
| G06F 21/51 | (2013.01) |
| G06F 21/80 | (2013.01) |

(52) U.S. Cl.
CPC ............ *G06F 21/575* (2013.01); *G06F 21/31* (2013.01); *G06F 21/57* (2013.01); *G06F 21/79* (2013.01); *G06F 21/80* (2013.01); *G06F 2221/2107* (2013.01)

(58) Field of Classification Search
CPC .................. G06F 21/575; G06F 21/57; G06F 2221/2107; G06F 21/79; G06F 21/80; G06F 21/31
See application file for complete search history.

(56) References Cited

U.S. PATENT DOCUMENTS

| | | | |
|---|---|---|---|
| 2003/0061494 A1* | 3/2003 | Girard et al. ................. | 713/189 |
| 2003/0107600 A1 | 6/2003 | Kwong et al. | |
| 2006/0129791 A1* | 6/2006 | Kwon ............................. | 713/1 |
| 2007/0282757 A1 | 12/2007 | Pandya et al. | |
| 2008/0055256 A1* | 3/2008 | Kwong et al. ................ | 345/173 |
| 2009/0067688 A1* | 3/2009 | Boshra et al. ................ | 382/124 |
| 2009/0319806 A1 | 12/2009 | Smith et al. | |
| 2011/0138166 A1* | 6/2011 | Peszek et al. .................... | 713/2 |
| 2011/0314279 A1 | 12/2011 | Ureche et al. | |

(Continued)

FOREIGN PATENT DOCUMENTS

EP          2 256 656          12/2010

OTHER PUBLICATIONS

Scarfone et al.; "Guide to Storage Encryption Technologies for End User Devices", National Institute of Standards and Technology, Special Publication 800-11, Nov. 2007, pp. i-D-1.

(Continued)

*Primary Examiner* — Theodore C Parsons
(74) *Attorney, Agent, or Firm* — Leason Ellis LLP

(57) ABSTRACT

An encryption system and method for a computing device having an encrypted operating system is disclosed. The encryption system includes a pre-operating system and an encrypted start-up module. The pre-operating system is executed on start-up of the computing device and is configured to receive user inputs for authenticating the user, the pre-operating system authenticating the user in dependence on the user inputs and, upon authentication, block-decrypting the encrypted start-up module into volatile memory for booting of the encrypted operating system on the computing device.

12 Claims, 3 Drawing Sheets

(56) References Cited

U.S. PATENT DOCUMENTS

| | | | | |
|---|---|---|---|---|
| 2012/0072735 | A1* | 3/2012 | Fukawa | G06F 21/62 |
| | | | | 713/189 |
| 2012/0254602 | A1* | 10/2012 | Bhansali et al. | 713/2 |
| 2012/0297175 | A1* | 11/2012 | Ekberg | 713/1 |
| 2013/0121488 | A1* | 5/2013 | Kang | H04L 9/0894 |
| | | | | 380/44 |
| 2013/0125107 | A1* | 5/2013 | Bandakka et al. | 717/171 |
| 2014/0130188 | A1* | 5/2014 | Baryudin | G06F 21/78 |
| | | | | 726/29 |

OTHER PUBLICATIONS

Kaplan, et al.; "RAM is Key: Extracting Disk Encryption Keys From Volatile Memory", Carnegie Mellon University, Thesis Report, May 2007, pp. 1-29.

* cited by examiner

SYSTEM, METHOD, AND DEVICE HAVING AN ENCRYPTED OPERATING SYSTEM

CROSS REFERENCE TO RELATED APPLICATIONS

This application claims the benefit of priority under 35 U.S.C. Sec. 119 of Great Britain Application No. 1204950.8 filed Mar. 21, 2012 which is hereby incorporated by reference as if set forth in its entirety herein.

FIELD OF THE INVENTION

The present invention relates to encryption systems that are particularly applicable to devices having an operating system stored in a non-volatile memory.

BACKGROUND TO THE INVENTION

Many mobile devices such as tablets and smart phones, as well as embedded devices, make use of an operating system stored within non-volatile memory, such as Flash memory.

Increasingly, it is becoming seen as good practice to encrypt mobile or embedded devices that contain even vaguely sensitive information. Indeed, loss of data is seen as being very bad from both publicity and a legal perspectives (particularly with regard to data protection legislation) and many companies are only slowly becoming aware of how vulnerable the data is that their employees are carrying around on tablets etc.

While a password protected boot sequence or lock screen is better than nothing on such devices, it does not stop a determined attacker. Generally, it is desirable for the data itself to be encrypted.

Common approaches to implementing encryption on such devices require that part of the operating system remains un-encrypted. The un-encrypted portion of the operating system is loaded by a bootloader during the boot process and executes prior to user authentication being performed. Successful user authentication allows an encryption key to be recovered and the encrypted portion of the operating system can then be loaded. This approach typically simplifies the engineering task, as components of the operating system are available to undertake user authentication tasks, including interacting with device specific hardware such as a touch screen device. However the approach has a significant disadvantage from a security perspective, as a portion of the operating system is still unencrypted. In such a situation, an attacker could tamper with the unencrypted portion of the operating system, potentially by exploiting a known vulnerability within the system, allowing user credentials to be subsequently captured and rendering the entire system vulnerable.

In order to avoid security exploits, it is desirable that the whole operating system of such devices is encrypted.

During start-up of a general purpose PC, a series of steps are performed, commonly in the following order:
a) When the PC is powered up, the Basic Input Output System (BIOS) is executed. The BIOS is typically firmware stored in read only memory, ROM, of the PC;
b) The BIOS may perform steps such as a power-on-self-test (POST) to check memory and other hardware components of the PC, it may also offer the user access to a setup menu to set hardware parameters;
c) A bootloader is then executed. In general purpose PCs, the bootloader is typically a relatively small program stored in ROM, along with the bare minimum of data needed to access the non-volatile devices from which the operating system programs and data may be loaded into RAM. Bootloaders may chain load functionality such that the initial code executed is simple but each step in the chain causes more complex functionality to the loaded.

The approach used in conventional disk-based computer systems for whole operating system encryption is to introduce a pre-operating system that utilises interrupts in the computer system's BIOS during bootloader execution. The pre-operating system facilitates authentication and key recovery in an environment that is separate to the encrypted operating system. Once the key has been recovered, all BIOS level input and output operations (to which higher level disk I/O are eventually decomposed into) are intercepted by a driver, such that encryption and decryption operations are appropriately included for disk access. In this manner, the disk holding the operating system can be fully encrypted. Only if authentication by the pre-operating system is successful is key recovery possible and as a result, access of the encrypted disk (both operating system and data) is only possible upon authentication.

Clearly, this significantly increases security as the authentication components are separated from the data and operating system. Even if the authentication system becomes compromised and an exploit is found to access the memory or disk on which it is stored, the data and operating system are encrypted and held elsewhere.

While whole disk encryption is well established in general purpose PCs such as desktops and laptops, many mobile device types do not lend themselves well to encryption and particularly not to that of the whole operating system. For example, mobile devices that make use of non-volatile Flash memory for operating system storage typically do not have BIOS interrupts that may be used to facilitate pre-operating system encryption. This is in contrast to encryption products designed for disk based systems that typically use BIOS interrupts or a similar mechanism, to intercept disk activity.

Unlike in general purpose PCs, in mobile devices the bootloader is often specific to the hardware configuration of the device. This is because it is required to perform specific hardware initiation tasks before the operating system is loaded. The bootloader component typically resides in non-volatile memory, and is effectively a component of the system's firmware.

In the case of flash-based systems, the approach taken to whole disk encryption in general purpose PCs is not possible due to architecture differences. In particular, within the typical architecture of flash-based devices, the initial operating system loader does not have hardware interrupts available for flash memory access. This prevents the same approach being taken for input and output interception using the driver model. Furthermore, the operating system is typically interconnected with the lower level functions in flash based systems. As a result, separation of the two so as to encrypt one but not the other is not straightforward. For example, if the non-volatile memory including the firmware is encrypted then the hardware functionality such as a touch screen interface would not be accessible to the pre-operating system environment as it would be implemented in the firmware. Consequently, there would be no input mechanism available to provide the pre-operating system environment.

STATEMENT OF THE INVENTION

According to an aspect of the present invention, there is provided an encryption system for a computing device having an encrypted operating system, the encryption system including computer program code executable by a processor of the computing device to operate the encrypted operating system on the computing device, including:

computer program code executable by the processor to provide a pre-operating system; and, encrypted computer program code executable by the processor, when decrypted, to operate a start-up module, wherein the pre-operating system is executable by the processor on start-up of the computing device and is configured to receive user inputs for authenticating the user, the pre-operating system including computer program code executable by the processor for authenticating the user in dependence on the user inputs and, upon authentication, for block-decrypting the encrypted start-up module into volatile memory for booting of the encrypted operating system on the computing device.

The decrypted start-up module may include computer program code executable by the processor to provide a filter for encryption and decryption of read and write operations between the computing device and the encrypted operating system.

The filter may comprise one or more kernel mode filter drivers executable by the processor transparently to the user and the operating system.

The encryption system may be encoded in a non-volatile memory of the computing device. The encrypted operating system may be encoded in a non-volatile memory of the computing device. The encryption system and encrypted operating system may be encoded in a common non-volatile memory. The non-volatile memory/memories may be flash memory/memories.

Preferably, the pre-operating system includes computer program code executable by the processor to perform said block decryption as a contiguous operation.

Preferably, the pre-operating system includes computer program code executable by the processor to block decrypt and chain-load the encrypted start-up module as a contiguous operation The pre-operating system may include computer program code executable by the processor to communicate, independently of said operating system, with a touch screen of the computer system to receive one or more of said user inputs for authenticating the user.

The pre-operating system may include computer program code executable by the processor to receive user inputs on user credentials and to obtain an encryption key in dependence on said user credentials for decrypting the encrypted operating system.

The computer system preferably includes an encryption key store in a non-volatile memory, the encryption key store securely encoding said encryption key and being accessible to said pre-operating system in dependence on said user credentials.

According to another aspect of the present invention, there is provided a method of encrypting an operating system of a computing device having non-volatile memory and a volatile memory, the method comprising:

writing a pre-operating system environment including a non-encrypted authentication module and an encrypted start-up module, the non-encrypted authentication module being executable by a processor of the computing device to receive user inputs for authenticating the user, to authenticate the user in dependence on the user inputs and, upon authentication, block-decrypt the encrypted start-up module into volatile memory of the computing device for execution;

encrypting the operating system in dependence on an encryption key and writing the encrypted operating system to the non-volatile memory; and, configuring the computing device to execute the authentication module on start-up of the computing device, wherein upon execution in volatile memory, the start-up module provides a filter driver for encryption and decryption of read and write operations for the encrypted operating system.

The method may further comprise interrogating the computer device to identify hardware of the computing device and providing one or more driver modules to the authentication module for communicating with said hardware independently of said operating system.

The method may further comprise securely encoding the encryption key in an encryption key store in the non-volatile memory of the computing device, wherein the encryption key is accessible to the authentication module upon authenticating the user.

According to another aspect of the present invention, there is provided a computing device comprising:

a processor;

a touch-screen user input device;

a volatile memory; and, a non-volatile memory encoding an encryption system and an encrypted operating system, the encryption system including computer program code executable by the processor to operate the encrypted operating system on the computing device, and including:

computer program code executable by the processor to provide a pre-operating system; and, encrypted computer program code executable by the processor when decrypted to operate a start-up module, wherein the pre-operating system is executable by the processor on start-up of the computing device and is configured to receive user inputs for authenticating the user via the touch-screen user input device, the pre-operating system including computer program code executable by the processor for authenticating the user in dependence on the user inputs and, upon authentication, for block-decrypting the encrypted start-up module into volatile memory for booting of the encrypted operating system on the computing device.

The computing device may comprise a tablet computing device (dockable or stand-alone) or a smartphone or some other form of computing device having its operating system stored in non-volatile memory such as flash memory.

The computing device preferably further comprises an encryption key store in the non-volatile memory, the encryption key store securely encoding said encryption key and being arranged to make accessible the encryption key to said pre-operating system upon authenticating the user.

The start-up module may include a kernel mode filter driver executable by the processor for providing encryption and decryption of read and write operations between the computing device and the encrypted operating system In one embodiment, an encryption system for a computing device has an encrypted operating system, the encryption system including a pre-operating system and an encrypted start-up module, the pre-operating system being arranged to be executed on start-up of the computing device and configured to receive user inputs for authenticating the user, the pre-operating system being arranged to authenticate the user in dependence on the user inputs and, upon authentication, block-decrypt the encrypted start-up module into volatile memory of the computing device, the pre-operating system environment being further configured to cause execution of the decrypted start-up module from volatile memory and, upon execution, the decrypted start-up module being configured to provide a filter for encryption and decryption of read and write operations between the computing device and the encrypted operating system and to cause booting of the encrypted operating system.

The encryption system is preferably encoded in non-volatile memory such as flash memory. Optionally, the encryption system and encrypted operating system may be encoded in a common non-volatile memory.

Preferably, the block decryption is performed as a contiguous operation.

BRIEF DESCRIPTION OF THE DRAWINGS

Embodiments of the present invention will now be described by way of example only with reference to the accompanying drawings in which.

DETAILED DESCRIPTION

Figure 1:
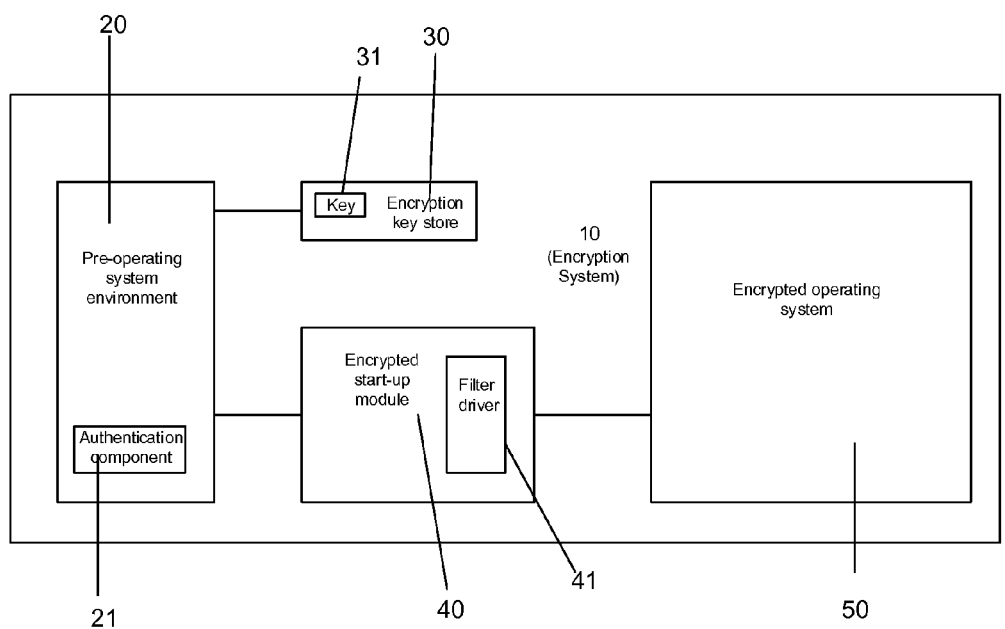
FIG. 1 is a schematic diagram of components of an encryption system according to an embodiment of the present invention.

FIG. 1 is a schematic diagram of components of an encryption system according to an embodiment of the present invention.

The system 10 includes a pre-operating system environment 20, an encryption key store 30 and an encrypted start-up module 40. The system is configured to communicate with an encrypted operating system 50 which may be provided as part of the system, created during installation from a non-encrypted operating system that may ship with the device, or may be provided separately (such as by a business's IT support department as a company approved operating system image). These may all be encoded in a common data repository or may be separated across two or more data repositories. Preferably, one or more of the data repositories is or includes a flash memory.

The pre-operating system environment includes an authentication component 21 that is configured to receive user inputs for the capture and processing of user credentials. The user credentials are used to recover an encryption key 31 stored in the encryption key store 30.

The pre-operating system environment 20 then uses the recovered key 31 to perform block decryption of the start-up module 40 into volatile memory, following which the start-up module is executed from volatile memory. As part of its execution, the start-up module 40 generates a full stack of kernel mode filter drivers 41 to support subsequent access of the encrypted operating system 50 using the recovered key for encryption/decryption of subsequent read/write file operations to the encrypted operating system 50.

The start-up module is preferably decrypted using AES block decryption, although other types of block encryption could be used including RSA block decryption.

It will be appreciated that the operating system may be encrypted using a different encryption scheme (and optionally need not be block-decryptable) to the start-up module.

The start-up module is preferably decrypted and chain-loaded as a contiguous operation. It will be appreciated that the start-up module and operating system could be encrypted using different keys, each of which could be retrieved at the appropriate time from the key store 30.

In operation, embodiments of the present invention avoid exposure of an un-encrypted portion of the operating system. User authentication is performed in the pre-operating system environment that recovers an encryption key. After loading and executing the operating system start-up routines, the key is then made available within a filter-driver model, such that all subsequent disk reads and writes are filtered to include an encrypt or decrypt operation.

A boot process is initiated by firmware, which loads the boot-loader. This allows the authentication component 21 within the pre-operating system environment 20 to load and execute the operating system loader (start-up module). The operating system loader then continues to access the disk using the kernel mode drivers which include an encrypting filter driver.

Figure 2:
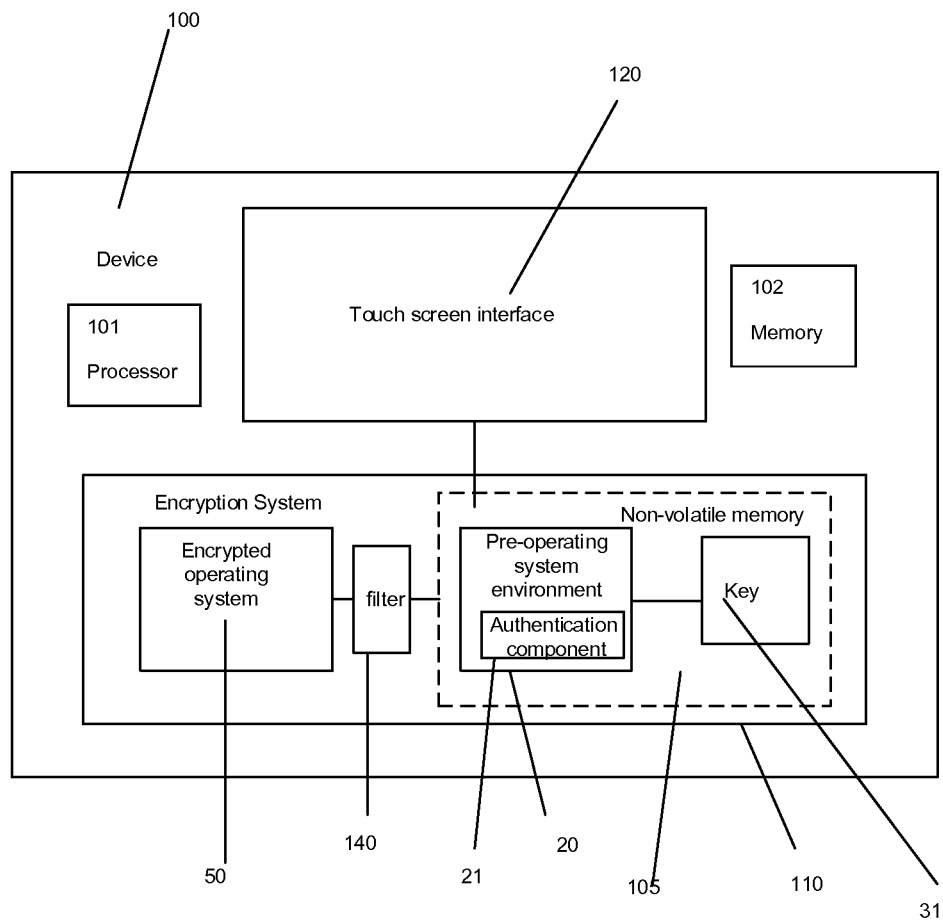
FIG. 2 is a schematic diagram of a device including the encryption system of FIG. 1 according to an embodiment of the present invention; and, FIG. 3 is a flow diagram of a method of encrypting a device according to an embodiment of the present invention.

FIG. 2 is a schematic diagram of a device 100 including the encryption system 110 of FIG. 1 according to an embodiment of the present invention. The device 100 includes volatile memory 102 and a processor 101 configured to execute the encryption system 110 which may itself be implemented in computer program code, a programmed logic device such as a field programmable gate array or some other software, logic or hardware device or combination thereof.

The system 110 allows complete encryption of an operating system 130 on a flash based device 100. A pre-operating system environment 20 is introduced into system firmware of the device 100 in its flash (non-volatile) memory store 105. The authentication component 21 is configured to interact via system hardware such as a touch screen interface 120 with a user, allowing the capture and processing of user credentials, and the recovery of an encryption key 31 stored in the non-volatile memory 105 for use in subsequently decrypting the encrypted operating system 50.

The firmware is configured to provide support for cryptographic processing. The pre-operating system environment is responsible for pre-operating system authentication and decryption of the encrypted operating system. As BIOS interrupts are not available as would be the case on a conventional disk-based computer system, the pre-operating system environment performs block decryption of the operating system start-up components into volatile memory, typically as a contiguous operation, following which the start-up routines are executed from volatile memory. Consequently, subsequent access to non-volatile memory is not required by the operating system start-up routines until the routines have chain-loaded and generated a full stack of kernel mode filter drivers to support subsequent access of the non-volatile memory. The operating system loader also initiates a kernel mode filter component 140 which is part of the encryption system 110 and is operable from volatile memory to decrypt/encrypt subsequent read and write operations, respectively, to the non-volatile (flash) memory. The kernel mode filter component 140 operates transparently to the user and the operating system.

In operation, embodiments of the present invention avoid exposure of an un-encrypted portion of the operating system. User authentication is performed in a pre-operating system environment that recovers an encryption key. After loading and executing the operating system start-up routines, the key is then made available within a filter-driver model, such that all subsequent disk reads and writes are filtered to include an encrypt or decrypt operation.

A boot process is initiated by firmware, which loads the boot-loader. This allows the authentication component within the pre-operating system environment to load and execute the operating system loader. The operating system loader then continues to access the disk using the kernel mode drivers which include an encrypting filter driver.

As the pre-operating system environment exists in unencrypted form within volatile memory, a sequence of integrity checks are preferably performed using cryptographic hash values that measure the state of the pre-operating system environment. An initial integrity check occurs within the pre-operating system environment, which is then replicated by application components accessing encrypted forms of the hash values within the operating system.

Figure 3:
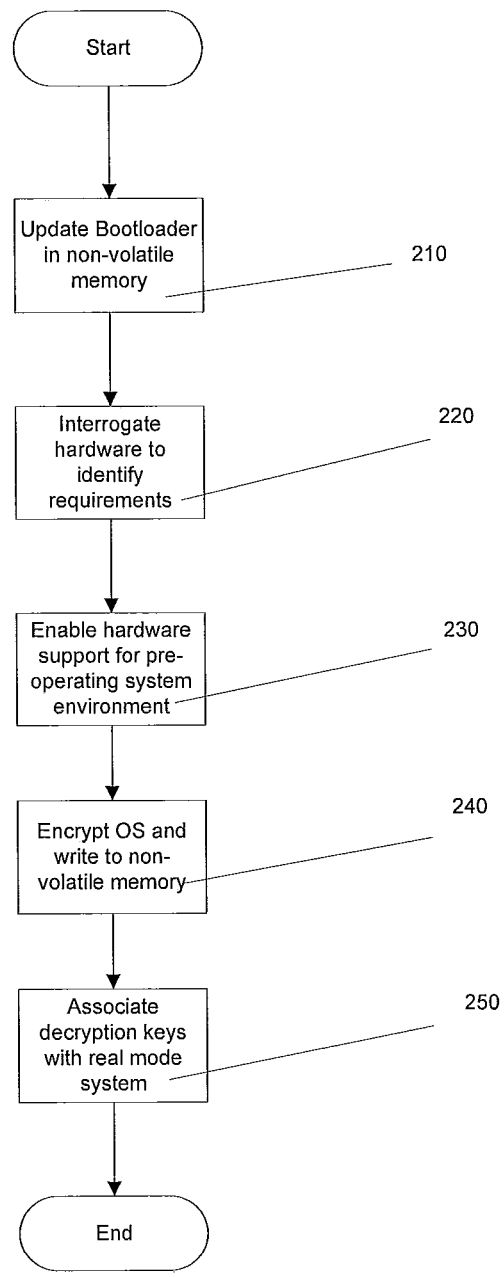

FIG. 3 is a flow diagram of a method of encrypting a device according to an embodiment of the present invention.

The device has an operating system and bootloader stored in non-volatile memory. In step 210, bootloader is updated or overwritten in the non-volatile memory. The changed bootloader includes a pre-operating system environment that supports encryption and decryption operations.

In step 220, the hardware and operating system of the device is then interrogated in order to identify hardware support requirements such as a digitiser driver for a touch screen interface. System components to support identified hardware support requirements are obtained and enabled (or enabled if already present) in the pre-operating system environment in step 230.

In step 240, the operating system is retrieved from the device and encrypted by an encryption key before being re-written to the non-volatile memory of the device.

A decryption key or similar tokens are then associated with the pre-operating system environment in step 250 to enable the system to decrypt the operating system upon successful authentication by a user.

It is to be appreciated that certain embodiments of the invention as discussed below may be incorporated as code (e.g., a software algorithm or program) residing in firmware and/or on computer useable medium having control logic for enabling execution on a computer system having a computer processor. Such a computer system typically includes memory storage configured to provide output from execution of the code which configures a processor in accordance with the execution. The code can be arranged as firmware or software, and can be organized as a set of modules such as discrete code modules, function calls, procedure calls or objects in an object-oriented programming environment. If implemented using modules, the code can comprise a single module or a plurality of modules that operate in cooperation with one another.

Optional embodiments of the invention can be understood as including the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although illustrated embodiments of the present invention have been described, it should be understood that various changes, substitutions, and alterations can be made by one of ordinary skill in the art without departing from the present invention which is defined by the recitations in the claims below and equivalents thereof.

The invention claimed is:

1. An encryption system for a computing device having an encrypted operating system stored within a non-volatile flash memory of the computing device, the encryption system comprising:
  a processor configured by executing computer program code stored in a non-volatile flash memory including:
  computer program code executable by the processor to provide a pre-operating system; and
    encrypted computer program code executable by the processor, when decrypted, to operate a start-up module,
  wherein the pre-operating system is executable by the processor on start-up of the computing device and is configured to receive from a user interface of the computing device, user inputs for authenticating the user, the pre-operating system including computer program code executable by the processor for authenticating the user in dependence on the user inputs and, upon authentication, for block-decrypting the encrypted start-up module as a contiguous operation into the volatile memory of the computing device for booting of the encrypted operating system on the computing device, the pre-operating system being further configured to cause execution of the decrypted start-up module from the volatile memory for booting of the encrypted operating system on the computing device,
  wherein, during execution, the start-up module generating a full stack of kernel mode filter drivers to support subsequent access of the encrypted operating system, and wherein BIOS interrupts are not available to the pre-operating system on start-up of the computing device, and
  wherein at least one of the encryption system and the encrypted operating system is encoded in the non-volatile flash memory of the computing device.

2. The encryption system of claim 1, wherein the full stack of kernel mode filter drivers of the decrypted start-up module includes computer program code executable by the processor to provide a filter for encryption and decryption of read and write operations between the computing device and storage where the encrypted operating system is stored.

3. The encryption system of claim 2, wherein the full stack of kernel mode filter drivers comprise one or more kernel mode filter drivers executable by the processor transparently to the user and the operating system.

4. The encryption system of claim 1, wherein the encryption system and encrypted operating system are encoded in a common non-volatile flash memory.

5. The encryption system of claim 1, wherein the pre-operating system includes computer program code executable by the processor to block decrypt and chain-load the encrypted start-up module as a contiguous operation.

6. The encryption system of claim, 1 wherein the pre-operating system includes computer program code executable by the processor to communicate, independently of said encrypted operating system, with a touch screen of the computing device to receive one or more of said user inputs for authenticating the user.

7. The encryption system of claim 1, wherein the pre-operating system includes computer program code executable by the processor to receive user inputs on user credentials and to obtain an encryption key in dependence on said user credentials for decrypting the encrypted operating system.

8. The encryption system of claim 7, wherein the computing device includes an encryption key store in a non-volatile flash memory, the encryption key store securely encoding said encryption key and being accessible to said pre-operating system in dependence on said user credentials.

9. A computing device comprising:
a processor;
a touch-screen user input device;
a volatile memory; and,
a non-volatile flash memory encoding an encryption system and an encrypted operating system, the encryption system including computer program code executable by the processor to operate the encrypted operating system on the computing device, and including:
computer program code executable by the processor to provide a pre-operating system; and,
encrypted computer program code executable by the processor when decrypted to operate a start-up module,
wherein the pre-operating system is executable by the processor on start-up of the computing device and is configured to receive user inputs for authenticating the user via the touch-screen user input device, the pre-operating system including computer program code executable by the processor for authenticating the user in dependence on the user inputs and, upon authentication, for block-decrypting the encrypted start-up module as a contiguous operation into volatile memory for booting of the encrypted operating system on the computing device, the pre-operating system being further configured to cause execution of the decrypted start-up module from volatile memory for booting of the encrypted operating system on the computing device, wherein during execution the start-up module is configured to generate a full stack of kernel mode filter drivers to support subsequent access of the encrypted operating system.

10. The computing device of claim 9, wherein the computing device comprises a tablet computing device or a smartphone.

11. The computing device of claim 9, further comprising an encryption key store in the non-volatile flash memory, the encryption key store securely encoding said encryption key and being arranged to make accessible the encryption key to said pre-operating system upon authenticating the user.

12. The computing device of claim 9, wherein the full stack of kernel mode filter drivers includes a kernel mode filter driver executable by the processor for providing encryption and decryption of read and write operations between the computing device and storage where the encrypted operating system is stored.

* * * * *